US006438835B1

(12) United States Patent
Chancey

(10) Patent No.: US 6,438,835 B1
(45) Date of Patent: Aug. 27, 2002

(54) METHOD AND SYSTEM FOR MANUFACTURING A CYLINDER HEAD

(75) Inventor: John Edward Chancey, Grosse Pointe Farms, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/619,466

(22) Filed: Jul. 19, 2000

(51) Int. Cl.[7] .............................. B23P 11/00; B23C 9/00

(52) U.S. Cl. ................................ 29/888.06; 209/527.6; 409/132; 409/133

(58) Field of Search ........................ 29/888.06, 888.061, 29/527.6, 563, 33 P; 483/32, 1; 409/131, 132, 133, 218, 80

(56) References Cited

U.S. PATENT DOCUMENTS

| | | | | | |
|---|---|---|---|---|---|
| 3,553,808 | A | * | 1/1971 | Koziara | 29/888.06 |
| 4,309,600 | A | * | 1/1982 | Perry et al. | 29/33 P |
| 4,646,423 | A | * | 3/1987 | Schlesinger et al. | 29/563 |
| 4,999,894 | A | * | 3/1991 | Berry et al. | 409/131 |
| 5,012,574 | A | * | 5/1991 | Pryor | 409/133 |
| 5,062,195 | A | * | 11/1991 | Binder | 29/563 |
| 5,091,861 | A | | 2/1992 | Geller et al. | |
| 5,368,539 | A | * | 11/1994 | Mills et al. | 483/1 |
| 5,435,674 | A | * | 7/1995 | Motzet et al. | 409/131 |
| 5,596,960 | A | | 1/1997 | Hazen | |
| 5,655,854 | A | * | 8/1997 | Foulk | 29/888.06 |
| 5,677,855 | A | | 10/1997 | Skeeters et al. | |
| 5,682,676 | A | * | 11/1997 | Ikegaya | 29/888.06 |
| 5,765,282 | A | | 6/1998 | Sweetland et al. | |
| 5,785,024 | A | | 7/1998 | Takei et al. | |
| 5,864,777 | A | | 1/1999 | Smith et al. | |
| 5,873,163 | A | * | 2/1999 | Diefenthaler et al. | 29/888.06 |
| 5,903,975 | A | * | 5/1999 | Gammill | 29/888.06 |
| 5,957,100 | A | | 9/1999 | Frohwerk et al. | |
| 6,013,016 | A | * | 1/2000 | Irvine et al. | 483/1 |
| 6,024,063 | A | | 2/2000 | Muter et al. | |
| 6,094,793 | A | * | 8/2000 | Szuba | 29/33 P |
| 6,149,561 | A | * | 11/2000 | Beecherl et al. | 483/1 |
| 6,224,473 | B1 | * | 5/2001 | Miller et al. | 451/461 |
| 6,283,681 | B1 | * | 9/2001 | Raiteri | 409/131 |

* cited by examiner

*Primary Examiner*—S. Thomas Hughes
*Assistant Examiner*—Marc Jimenez
(74) *Attorney, Agent, or Firm*—Damian Porcari

(57) ABSTRACT

A method and system for machining a cylinder head include loading a cylinder head into a first five axis computer numerically controlled (CNC) machine. A first fixture of the first CNC machine is then located against a top surface of the cylinder head such that the cylinder head is in a horizontal position. The first CNC machine then machines the cylinder head in the horizontal position. A second fixture of the first CNC machine is then located against a bottom surface of the cylinder head such that the cylinder head is in a vertical position. The first CNC machine then machines the cylinder head in the vertical position. The cylinder head is then moved into a second five axis CNC machine. A fixture of the second CNC machine is then located against a bottom surface of the cylinder head. The second CNC machine then machines the cylinder head.

3 Claims, 3 Drawing Sheets

METHOD AND SYSTEM FOR MANUFACTURING A CYLINDER HEAD

TECHNICAL FIELD

The present invention generally relates to cylinder head manufacturing methods and systems and, more particularly, to a method and system for machining a cylinder head using a pair of five axis computerized numerical control (CNC) machines in three machining setups.

BACKGROUND ART

Typically, cylinder heads are machined in eight to twenty or more machining setups. A problem associated with so many machining setups is part variability and system inefficiencies incurred by stringing machines out serially as opposed to a parallel system. What is needed is a method for machining cylinder heads in less machining setups using a minimal amount of CNC machines.

DISCLOSURE OF INVENTION

Accordingly, it is an object of the present invention to provide a method for machining a cylinder head using a pair of five axis computerized numerical control (CNC) machines in three or less machining setups.

In accordance with the above object and other objects, the present invention provides a method and system for machining a cylinder head. The method and system include loading a cylinder head into a first five axis computer numerically controlled (CNC) machine. A first fixture of the first CNC machine is then located against a top surface of the cylinder head such that the cylinder head is in a horizontal position. The first CNC machine then machines the cylinder head in the horizontal position. A second fixture of the first CNC machine is then located against a bottom surface of the cylinder head such that the cylinder head is in a vertical position. The first CNC machine then machines the cylinder head in the vertical position. The cylinder head is then moved into a second five axis CNC machine. A fixture of the second CNC machine is then located against a bottom surface of the cylinder head. The second CNC machine then machines the cylinder head.

Preferably, the first fixture of the first CNC machine is located against a top surface of the cylinder head with respect to cylinder head cast locators and combustion chamber buttons of the cylinder head. The second fixture of the first CNC machine is located against a bottom surface of the cylinder head with respect to manufacturing holes of the cylinder head.

Preferably, the first CNC machine machines the cylinder head in the horizontal position by orienting a spindle of the first CNC machine adjacent the bottom surface of the cylinder head to machine the bottom surface of the cylinder head with the spindle as a function of depth of the combustion chamber buttons of the cylinder head.

BRIEF DESCRIPTION OF DRAWINGS

The present invention will now be described in further detail and, by way of example, with reference to the accompanying drawings, in which.

BEST MODE FOR CARRYING OUT THE INVENTION

Figure 1:
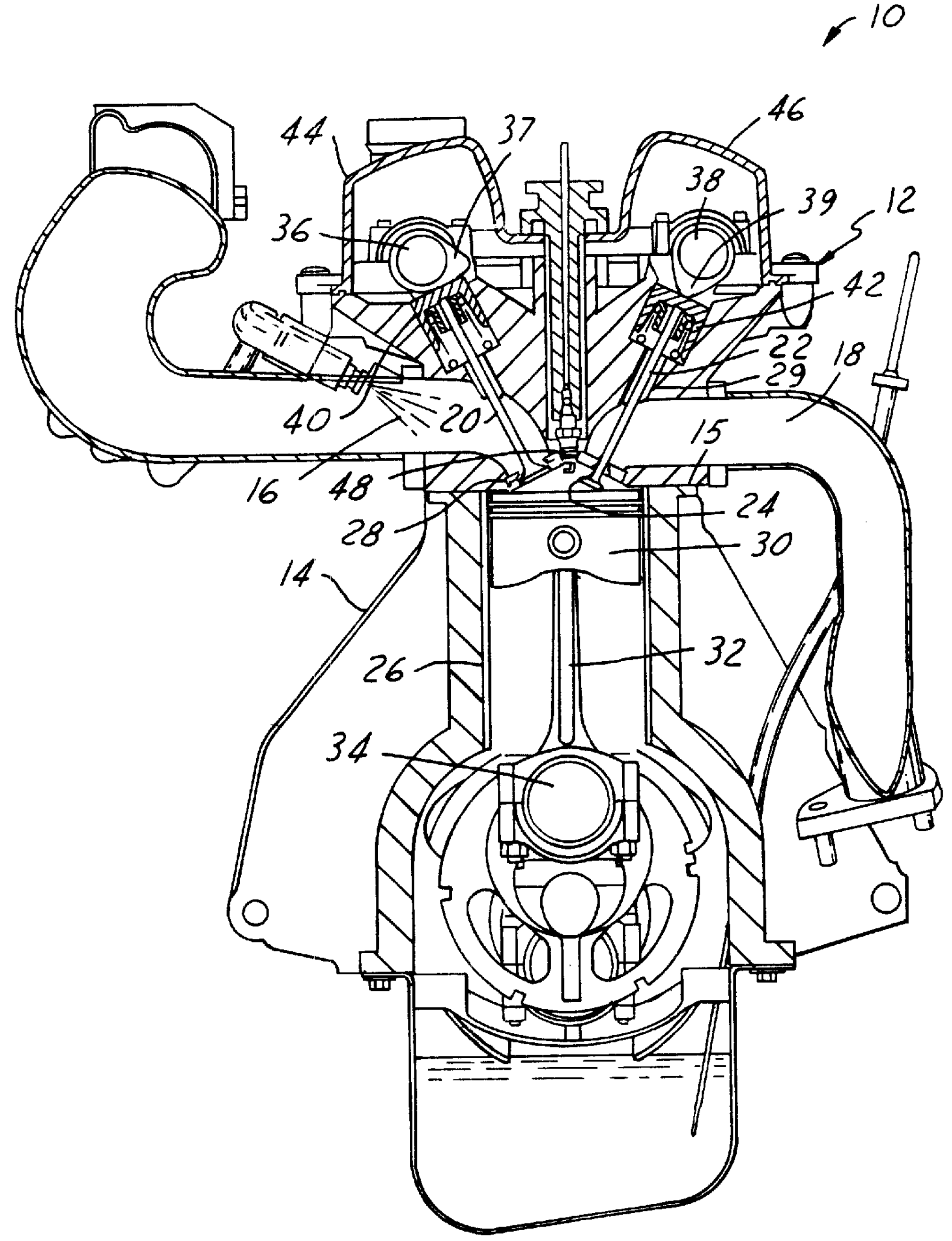
FIG. 1 illustrates a schematic cross-sectional view of an example of an engine assembly having a cylinder head machined in accordance with the method and system of the present invention.

Referring now to FIG. 1, a schematic cross-sectional view of an exemplary engine assembly 10 having a cylinder head 12 machined in accordance with the method and system of the present invention is shown. It is to be noted that cylinder head 12 is just one example of the many different types of cylinder heads that may be machined in accordance with the present invention. General examples of such cylinder heads include those for two and four cycle engines, those having overhead camshafts and camshafts located in the cylinder block, those having push rod configuration, and the like. Cylinder head 12 mounts to a cylinder block 14 via a cylinder head gasket 15. Cylinder head 12 includes an intake face 16 having intake ports and an exhaust face 18 having exhaust ports. Cylinder head 12 further includes a plurality of intake valves 20 and exhaust valves 22 each associated with a respective top cylinder combustion chamber section 24 of the cylinder head. Intake valves 20 and exhaust valves 22 are movable within respective top cylinder combustion chamber sections 24 of cylinder head 12. Intake and exhaust ports lead from top cylinder combustion chamber sections 24 to the intake and exhaust manifolds. The ends of the intake and exhaust ports that enter top cylinder combustion chamber sections 24 contain respective valve seats 28. Additionally, valve guides 29 which help align valves 20,22 are machined into cylinder head 12.

Top cylinder combustion chamber sections 24 of cylinder head 12 are positioned over corresponding bottom cylinder bores 26 of cylinder block 14. A piston 30 fits into each bottom cylinder bore 26. A connecting rod 32 connects piston 30 to a crankshaft 34. Piston 30 in conjunction with other pistons of engine assembly 10 moves up and down in cylinder bore 26 to rotate crankshaft 34. Preferably, engine assembly 10 includes a number of cylinder/piston assemblies which are configured for conventional four cycle operation. The rotation of crankshaft 34 provides driving power from engine assembly 10 to move a vehicle.

Cylinder head 12 includes a valve train for opening and closing valves 20,22. The valve train may include a camshaft 36, or have a push rod rocker configuration, operable for opening and closing intake valves 20 and a camshaft 38 operable for opening and closing exhaust valves 22. Both camshafts 36, 38 have cam lobes 37, 39 which contact valve spring and bucket tappet assemblies 40, 42 to move valves 20,22 up and down for closing and opening access between ports 16, 18 and combustion chambers 24, 26. Camshafts 36, 38 are housed within respective cam towers 44, 46 of cylinder head 12. Cylinder head 12 further includes a spark plug 48 for providing a spark in combustion chambers 24,26.

Figure 2:
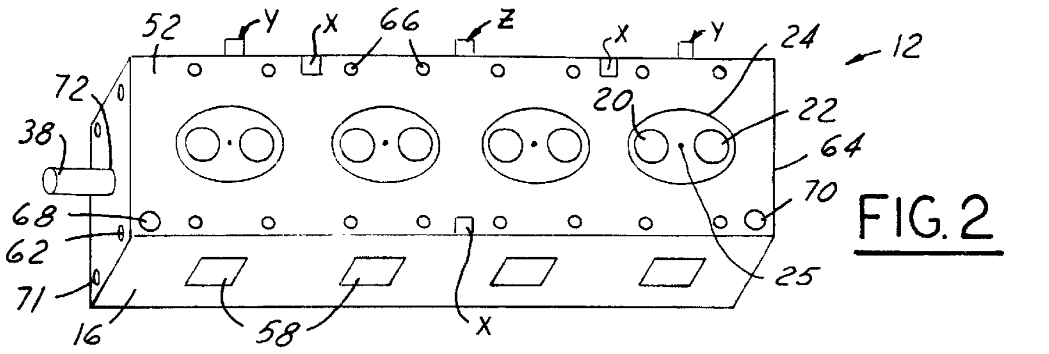
FIG. 2 illustrates a bottom view of a cylinder head to be machined in accordance with the method and system of the present invention.
Figure 3:
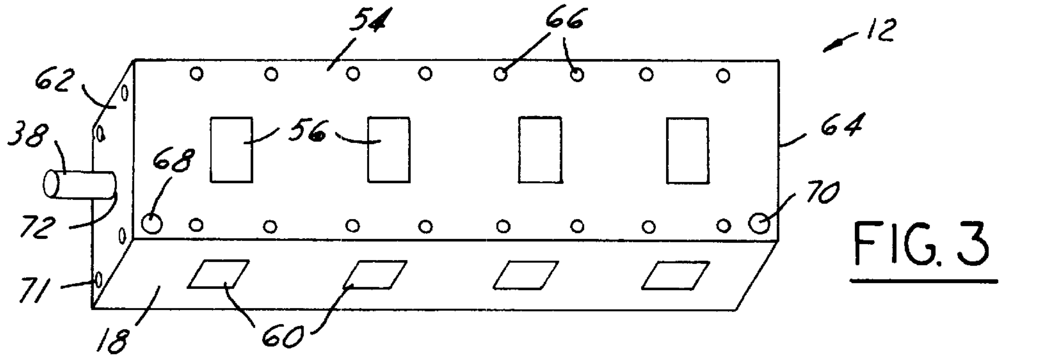
FIG. 3 illustrates a top view of the cylinder head shown in FIG. 2.

Referring now to FIGS. 2 and 3, with continual reference to FIG. 1, respective bottom and top views of cylinder head 12 are shown. Cylinder head 12 includes a bottom surface 52 (joint face) which attaches to cylinder block 14 via head gasket 15 and cylinder head bolts. Cylinder head 12 includes a top surface 54 (rocker cover rail side) having a plurality of cam towers 56. Intake face 16 has an intake port 58 associated with each combustion chamber 24. Similarly, exhaust face 18 has an exhaust port 60 associated with each combustion chamber 24. Cylinder head 12 has a front face 62 and a rear face 64.

Cylinder head 12 includes a plurality of fastener apertures 66 for bolting the cylinder head to cylinder block 14. Cylinder head 12 further includes a pair of manufacturing holes 68,70. Camshaft 38 extends through cylinder head 12 along a camshaft bore 72. Cylinder head 12 further includes "Y", "X", and "Z" cast locators (one "Z", two "Y" and three "X" cast locators) for orienting the cylinder head in a five axis CNC machine. Cylinder head 12 also includes oil holes 71 for enabling oil to lubricate the running parts of the cylinder head.

Figure 4:
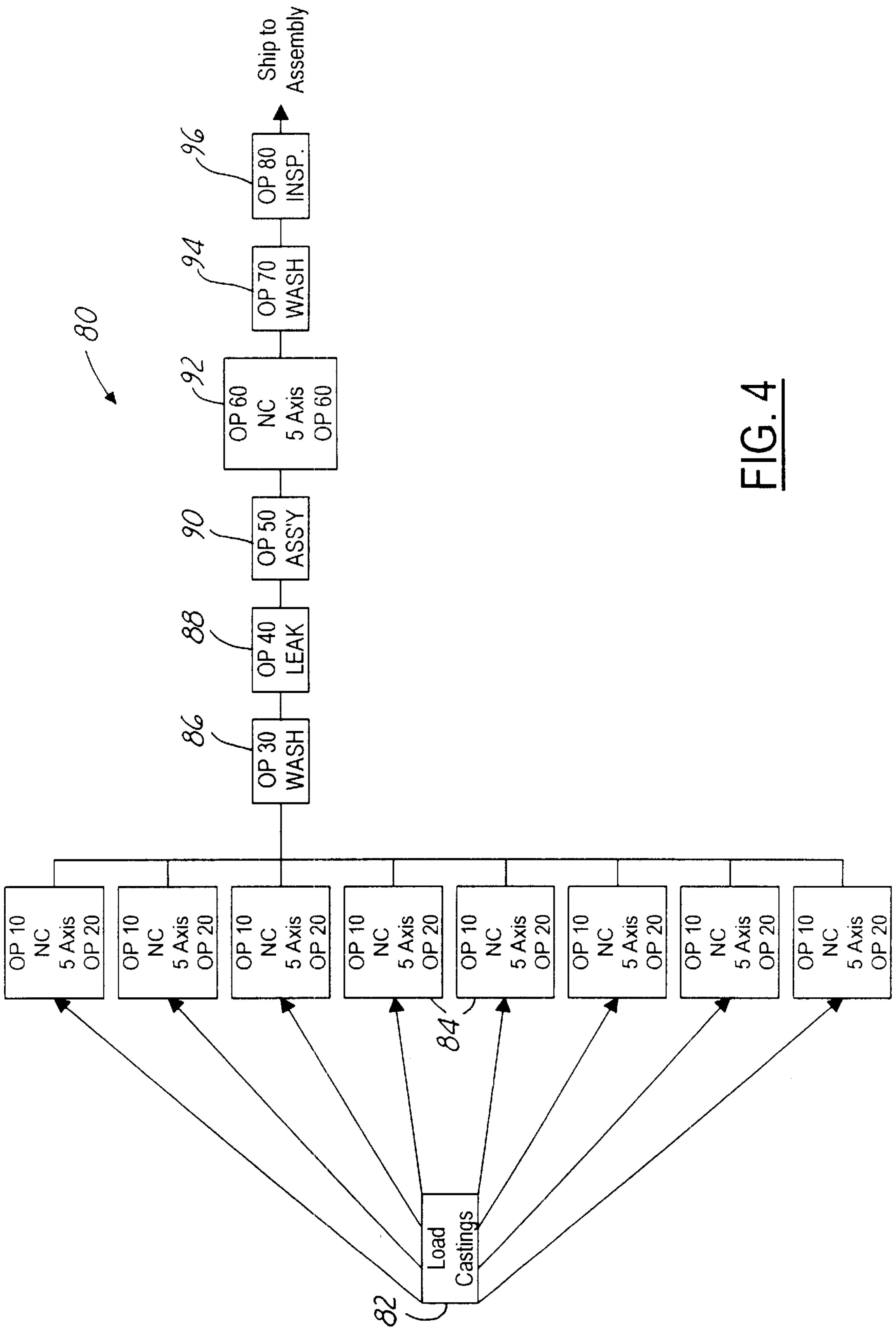
FIG. 4 illustrates a block diagram describing overall operation of the method and system of the present invention.

Referring now to FIG. 4, a block diagram 80 describing overall operation of the method and system of the present invention is shown. Block diagram 80 describes a series of operations (OP) for machining cylinder head 12 in accordance with the present invention. In general, the series of operations include performing three machining setups in a five axis CNC machine for machining a cylinder head. Preferably, the first two machining setups are performed in a first five axis CNC machine and the third and final machining setup is performed in a second five axis CNC machine. Alternatively, all three machining setups are performed in the first CNC machine.

Initially, a plurality of cylinder head castings are each loaded into respective five axis computer numerically controlled (CNC) machines as shown in block 82. Each of the parallel arranged five axis CNC machine are used to perform the same operations on respective cylinder head castings as shown in blocks 84. Accordingly, only machining operations (OP-10 and OP-20) of one of the five axis CNC machines on a cylinder head casting will be described further in detail below.

Figure 5:
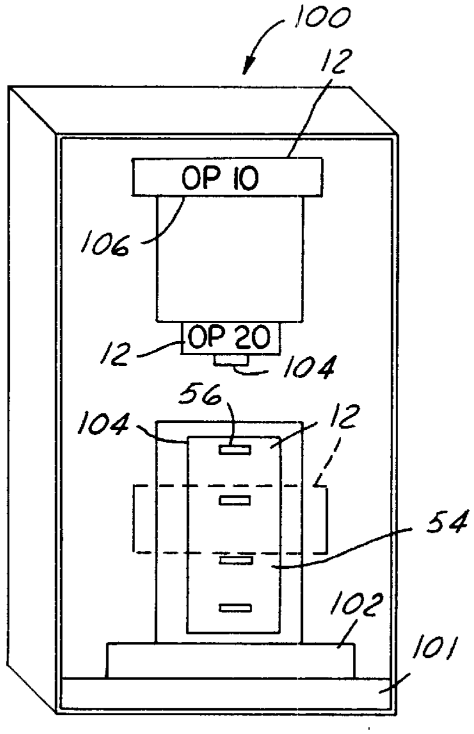
FIG. 5 illustrates the configuration of a five axis CNC machine for the first and second machining setups.

Referring now to FIG. 5, with continual reference to FIGS. 1–4, a configuration of a five axis CNC machine 100 for performing first and second machining operations OP-10 and OP-20 shown in block 84 is shown. CNC machine 100 includes a five dimensional motion system including three rigid carriages for three coordinate axis (X, Y, Z) translational movement, a fourth axis rotating for A-axis rotation, and a fifth axis for B-axis tilt.

CNC machine 100 includes two pallets (not shown). One pallet holds two cylinder heads for first and second machining operations OP-10 and OP-20 and the other pallet acts as a station for unloading and loading cylinder heads. CNC machine 100 generally operates in accordance with a description of the cylinder head and parameters for machining the cylinder head with a spindle. CNC machine 100 moves cylinder head 12 along a three dimensional path while machining the cylinder head with the spindle in accordance with the desired parameters.

CNC machine 100 includes a machine table 101, a tombstone 102, and a pair of fixtures 104 and 106. Tombstone 102 and fixtures 104 and 106 hold cylinder head 12 in CNC machine 100 for performing machining of the cylinder head in accordance with first and second machining operations OP-10 and OP-20.

CNC machine 100 first performs first machining operation OP-10 on cylinder head 12. To do so, fixture 106 locates off of "Y" and "Z" cast locators on cylinder head 12. Fixture 106 holds cylinder head 12 in a horizontal (or vertical) position and top surface 54 of the cylinder head clamps up against a rocker cover. CNC machine 100 then probes the three "X" cast locators and orients bottom surface 52 of cylinder head 12 perpendicular to the spindle of the CNC machine. Then CNC machine 100 probes combustion chamber buttons 25 each within respective top cylinder combustion chamber sections 24 for face depth. During the probing operation CNC machine 100 rotates cylinder head 12 to equalize combustion chamber button depth. CNC machine 100 then orients cylinder head 12 to machine bottom surface 52 as a function of the face depth of top cylinder combustion chamber sections 24 and then mills the bottom surface (joint face). CNC machine 100 then drills all fastener apertures 66, finish reams manufacturing holes 68, 70, and drills and taps oil holes 71.

CNC machine 100 then rolls cylinder head 12 to a desired angle for finishing intake and exhaust valves 16, 18 parent metal work. Machine table 101 is then indexed by 90 degrees to perform milling, drilling, and tapping procedures on front thrust face 62 and the cam thrust face. Machine table 101 is then indexed by 180 degrees to perform milling, drilling, and tapping procedures on rear thrust face 64 and the cam thrust face.

CNC machine 100 then performs second machining operation OP-20 on cylinder head 12. To do so, fixture 104 locates off of manufacturing holes 68, 70 and bottom surface 52 of cylinder head 12 and clamps up against the bottom surface to hold the cylinder head in a vertical (or horizontal) position such that top surface 54 is oriented towards the spindle of the CNC machine. CNC machine 100 then finishes rocker cover rails, semi finishes cam ½ rounds, mills cam towers 56, and then drills, taps, and reams the dowels of cylinder head 12. CNC machine 100 then spot face fastener apertures 66, finishes cam oil feeds, hydraulic lash adjusters, spring seats, and spark plug holes, and drills cam shaft oil passages. Machine table 101 is then indexed by 90 degrees to perform milling, drilling, and tapping procedures on exhaust face 18. Machine table 101 is then indexed by 180 degrees to perform milling, drilling, and tapping procedures on intake face 16.

As shown in FIG. 4, after the five axis CNC machine 100 performs the first and second machining operations OP-10 and OP-20 on cylinder head 12 the cylinder head is then removed from the five axis CNC machine and washed as shown in operations OP-30 block 86. The oil galleys and water passages of cylinder head 12 are then leaked tested as shown in operations OP-40 block 88. The valve guides, valve seats, and cam caps are installed in cylinder head 12 as shown in operations OP-50 block 90.

Cylinder head 12 is then moved into a second five axis CNC machine 120 as shown in operations OP-60 block 92 for a third and final round of machining. CNC machine 120 is identical to CNC machine 100. Accordingly, cylinder head 12 could be moved back into CNC machine 100 for the third round of machining. However, it is envisioned that during manufacturing CNC machine 100 will perform the second round of machining on a new cylinder head while CNC machine 120 performs the third round of machining on cylinder head 12.

Figure 6:
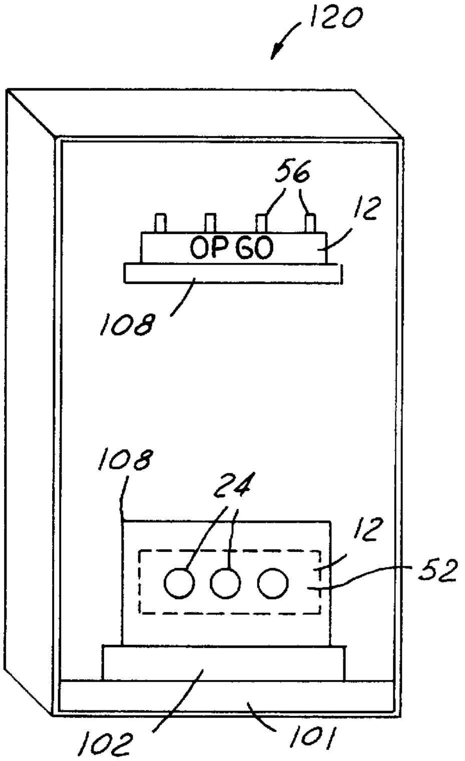
FIG. 6 illustrates the configuration of the five axis CNC machine for the third and final machining setup.

Referring now to FIG. 6, with continual reference to FIGS. 1 through 5, CNC machine 120 performs the third round of machining on cylinder head 12 by initially locating fixture 108 off of manufacturing holes 68,70 and bottom surface 52 of cylinder head 12 and clamps up against the bottom surface. CNC machine 120 then finishes valve train work including finishing intake and exhaust seats and guides 28,29. Machine table 101 is then indexed 90 degrees to enable CNC machine 120 to finish cam shaft bore 72.

As shown in FIG. 4, after the second five axis CNC machine 120 performs the third machining operation OP-60 on cylinder head 12, the cylinder head is then removed from the second five axis CNC machine and washed as shown in operations OP-70 block 94. Cylinder head 12 is then inspected and shipped for assembly to cylinder block 14 as shown in operations OP-80 block 96.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for machining a cylinder head having a top surface and a bottom surface, the method comprising:

loading a cylinder head into a first five axis computer numerically controlled (CNC) machine;

locating a first fixture of the first CNC machine with respect to cylinder head cast locators against the top surface of the cylinder head such that the cylinder head is in a horizontal position with the top surface of the cylinder head being clamped against the first fixture;

probing cast locators of the bottom surface of the cylinder head with the first CNC machine in order to orient the bottom surface of the cylinder head perpendicular to a spindle of the first CNC machine;

probing combustion chamber buttons of the bottom surface of the cylinder head with the first CNC machine in order to orient the bottom surface of the cylinder head to equalize depth of the combustion chamber buttons;

machining the bottom surface of the cylinder head with the spindle of the first CNC machine as a function of the depth of the combustion chamber buttons while the cylinder head is in the horizontal position;

locating a second fixture of the first CNC machine with respect to manufacturing holes of the bottom surface of the cylinder head against the bottom surface of the cylinder head such that the cylinder head is in a vertical position with the bottom surface of the cylinder head being clamped against the second fixture;

machining the top surface of the cylinder head with the spindle of the first CNC machine while the cylinder head is in the vertical position;

moving the cylinder head into a second five axis CNC machine;

locating a third fixture of the second CNC machine with respect to manufacturing holes of the bottom surface of the cylinder head against the bottom surface of the cylinder head such that cylinder head is in the horizontal position with the bottom surface of the cylinder head being clamped against the third fixture; and machining the top surface of the cylinder head with a spindle of the second CNC machine while the cylinder head is in the horizontal position.

2. The method of claim 1 wherein machining the bottom surface of the cylinder head with the spindle of the first CNC machine further comprises:

indexing the cylinder head by 90 degrees; and machining a front side face of the cylinder head with the spindle of the first CNC machine.

3. The method of claim 2 wherein machining the bottom surface of the cylinder head with the spindle of the first CNC machine further comprises:

indexing the cylinder head by 180 degrees; and machining a rear side face of the cylinder head with the spindle of the first CNC machine.

* * * * *